United States Patent Office 3,226,423
Patented Dec. 28, 1965

3,226,423
MERCAPTODICYANOVINYL SULFIDES
Robert D. Vest, Wilmington, Del., assignor to E. I. du Pont de Nemours and Company, Wilmington, Del., a corporation of Delaware
No Drawing. Filed June 20, 1962, Ser. No. 203,740
10 Claims. (Cl. 260—465.5)

This invention relates to a new class of organic sulfur-nitrogen compounds. More particularly, it relates to new unsaturated organic sulfides containing cyano and substituted mercapto groups and to processes for preparing these compounds.

The new compounds made available by this invention are mecaptodicyanovinyl sulfide derivatives having the formula:

I.
$$\begin{array}{ccc} CN & Y & Y^1 & CN \\ | & | & | & | \\ C=C-S-C=C \\ | & & | \\ X & & X^1 \end{array}$$

where one of X and Y and one of $X^1$ and $Y^1$ is —CN, the other being a group —SR where R is a metal ion, an ammonium ion, an alkylammonium ion or a hydrocarbon radical.

It will be seen from the above definition that (neglecting cis-trans isomers) structure I includes only the following three possible position isomers (empirical formula $C_8N_4S_3R_2$):

$$\begin{array}{cccc} CN & CN & CN & CN \\ | & | & | & | \\ C=C-S-C=C & , & C=C-S-C=C \\ | & | & | & | \\ SR & SR & SR & SR & CN \end{array}$$

and $$\begin{array}{cc} CN & CN \\ | & | \\ C=C-S-C=C \\ | & | & | & | \\ SR & SR & SR & CN \end{array}$$

These products are prepared by a one- or two-step process as follows:

The products having structure I wherein R is an alkali metal ion are prepared by reacting an alkali metal xanthate or an alkali metal salt of a dithiocarbamic acid having hydrogen on the carbamyl nitrogen with a heterocyclic cyanosulfide of the formula $C_8N_4S_n$, where $n$ is 2 or 3, and whose molecule contains one of the segments $$-S-C=C-S- \quad \text{and} \quad -S-C-S- $$
$$\begin{array}{cc} | & | \\ CN & CN \end{array} \qquad \begin{array}{c} || \\ C \\ / \ \backslash \\ NC \quad CN \end{array}$$

as part of the heterocyclic ring. The reaction which takes place is represented by the following equation, using tetracyanol-1,4-dithiin and potassium ethyl xanthate as the illustrative reactants:

$$\begin{array}{c} S \\ / \ \backslash \\ NC-C \quad C-CN \\ || \quad || \quad + \quad 2C_2H_5O-\overset{S}{\underset{||}{C}}-SK \longrightarrow \\ NC-C \quad C-CN \\ \backslash \ / \\ S \end{array}$$

$$\begin{array}{cccc} CN & CN & CN & CN \\ | & | & | & | \\ C=C-S-C=C + C_2H_5O-C-S-C-OC_2H_5 \\ | & | & || & || \\ SK & SK & S & S \end{array}$$

The reaction product in this case is the dipotassium salt of bis(2-mercaptodicyanovinyl) sulfide and the by-product is the known anhydrosulfide of ethyl xanthic acid. Similar results are obtained when the alkali metal xanthate is replaced by an alkali metal dithiocarbamate having hydrogen on the carbamyl nitrogen.

The products of Formula I wherein R stands for another metal, for example, a monovalent metal such as copper or silver or a polyvalent metal such as barium, iron, nickel, zinc, mercury or lead, are prepared by conventional metathetical reactions between an alkali metal salt (mercaptide) of a mercaptodicyanovinyl) sulfide, as obtained in the first step, and a salt of a strong inorganic acid of the metal it is desired to introduce, e.g., a nitrate, chloride or sulfate of the metal. Such a salt of a strong inorganic acid may be written as RA, wherein R is the metal it is desired to introduce and A is the anion moiety which is derived from a strong inorganic acid HA, e.g., nitric, hydrochloric or sulfuric acids.

The products of Formula I where R is an ammonium or alkylammonium ion or a hydrocarbon radical are also prepared from the alkali metal mercaptides, or in some cases preferably the silver mercaptides, of the mercaptodicyanovinyl sulfides by a metathetical reaction whereby the metal cation is replaced by an ammonium or alkylammonium cation or a hydrocarbon radical. The reactant in this reaction is a halide of the formula R-Hal., where Hal. is a halogen atom of atomic number 17 to 53 (chlorine, bromine or iodine) and R represents one of the following groups:

(1) Ammonium, including alkylammonium, cations of the type $R^1{}_mH_{4-m}N^+$, where $m$ is an integer from 0 to 4 and $R^1$ is an alkyl group, preferably of 1 to 6 carbon atoms. Thus, examples of suitable ammonium halide reactants (R-Hal.) include $NH_4{}^+BR^-$, $CH_3NH_3{}^+Cl^-$ $(C_2H_5)_2NH_2{}^+I^-$, $(C_4H_9)_3NH^+Cl^-$ $(C_2H_5)_4N^+Br^-$, $(C_5H_{11})_4N^+Cl^-$, $(C_6H_{13})_4N^+I^-$, etc. Mixtures of ammonium halides can be used, such as are usually obtained in the alkylation of ammonia with an alkyl halide. The quaternary ammonium halides $(R^1)_4N^+Hal.^-$ are preferred reactants in this reaction.

(2) Hydrocarbon radicals, preferably of 1 to 12 carbon atoms. Thus, R can be alkyl, alkenyl, cycloalkyl, aryl, aralkyl or alkaryl. Examples of suitable halohydrocarbon reactants (R-Hal.) are ethyl chloride, n-propyl iodide, sec.-butyl bromide, n-octyl diodide, n-dodecyl bromide, allyl bromide, cyclohexyl chloride, iodobenzene, 1-bromonaphthalene, benzyl chloride, p-bromotolene, etc. The preferred reactants are the alkyl halides of 1 to 12 carbon atoms.

Metathetical reactions of this kind are commonly used to introduce the above-named substituents on a sulfur atom, and therefore require no elaborate description.

The cyclic cyanosulfides which serve as starting materials in the process of this invention are the following compounds:

I. Tetracyano-1,4-dithiin, $$\begin{array}{c} S \\ / \ \backslash \\ NC-C \quad C-CN \\ || \quad || \\ NC-C \quad C-CN \\ \backslash \ / \\ S \end{array}$$

II. 4,5-dicyano-1,3-dithiole-$\Delta^{2,\alpha}$-malononitrile, also called 2-dicyanomethylene-4,5-dicyano-1,3-dithiolene.

$$\begin{array}{c} S \\ NC-C \quad \diagdown \quad CN \\ || \quad \quad \diagup \\ NC-C \quad \quad C=C \\ \diagdown \quad \diagup \quad \diagdown \\ S \quad \quad CN \end{array}$$

III. 3,5-bis-dicyanomethylene-1,2,4-trithiolane, $$\begin{array}{c} NC \quad \quad S \quad \quad CN \\ \diagdown \quad \diagup \quad \diagdown \quad \diagup \\ C=C \quad \quad C=C \\ \diagup \quad | \quad \quad | \quad \diagdown \\ NC \quad S———S \quad CN \end{array}$$

As can be seen, each cyanosulfide has one of the empirical formulas $C_8N_4S_2$ or $C_8N_4S_3$, and is characterized by the presence of one of the segments

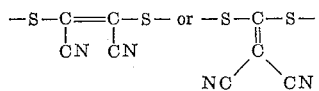

as part of the cyclic configuration. Of these materials, the preferred one is tetracyano-1,4-dithiin, which is readily prepared from inexpensive reactants (carbon disulfide, sodium cyanide and chlorine).

These various cyanosulfides can be prepared by the methods described below.

I. TETRACYANO-1,4-DITHIIN

This compound has been reported in the literature [G. Bähr, Angew. Chem. 70, 606–7, (1958)]. A very good method for its preparation is described in U.S. Patent 3,008,967 to Blomstrom and Smith.

II. 4,5-DICYANO-1,3-DITHIOLE-$\Delta^{2,a}$-MALONONITRILE

This product can be prepared by the reaction of 1,2-dichloro-1,2-dicyanoethylene [i.e., dichloromaleonitrile or dichlorofumaronitrile], with dipotassium (or disodium) 1,1-dimercapto-2,2-dicyanoethylene, in accordance with the equation:

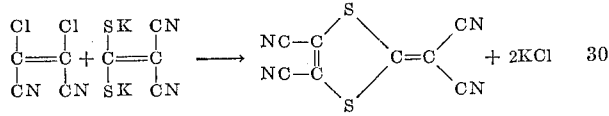

A. Dipotassium 1,1-dimercapto-2,2-dicyanoethylene

In a one-liter, three-neck flask fitted with a stirrer, thermometer, and dropping funnel was placed a solution of 60 g. of potassium hydroxide in 650 ml. of denatured ethyl alcohol. The solution was cooled to 0° C. and 35.4 g. (0.536 mole) of freshly distilled malononitrile was added in one portion, followed by the dropwise addition of 41 g. (0.54 mole) of carbon disulfide at 0–10° C. Toward the end of the addition, a canary-yellow salt began to precipitate. After stirring for one hour more at 0–5° C., the solid was collected on a filter and washed with 50 ml. of cold ethyl alcohol. After drying to constant weight at 80° C. and less than 1 mm. pressure, there was obtained 109 g. (94%) yield of dipotassium 1,1-dimercapto-2,2-dicyanoethylene as a yellow water-soluble solid which did not melt below 250° C.

*Analysis.*—Calc'd for $C_4N_2S_2K_2$: C, 22.01; S, 29.36. Found: C, 21.76; S, 29.23.

B. 4,5-dicyano-1,3-dithiole-$\Delta^{2,a}$-malononitrile

To a solution of 2.50 g. (0.0115 mole) of dipotassium 1,1-dimercapto-2,2-dicyanoethylene in 50 ml. of methanol was added in one lot 1.47 g. (0.01 mole) of dichlorofumaronitrile at room temperature. After stirring for 15 minutes, the reaction mixture was poured into 300 ml. of water and the solid which precipitated was collected on a filter (1.12 g.). Recrystallization from hot toluene after treatment with decolorizing carbon yielded 0.99 g. of yellow needles, m.p. 208–209° C. This was shown by elemental and spectral analyses to be 4,5-dicyano-1,3-dithiole-$\Delta^{2,a}$-malononitrile.

*Analysis.*—Calc'd for $C_8N_4S_2$: C, 44.43; S, 29.64. Found: C, 43.97; S, 30.01.

Further recrystallizations from toluene gave a product of somewhat higher melting point (212–214° C.).

III. 3,5-bis-dicyanomethylene-1,2,4-trithiolane

This product can be obtained by reaction of bromine with disodium 1,1-dimercapto-2,2-dicyanoethylene. A by-product of this reaction is 3,5-dibromo-4-isothiazolecarbonitrile. A preparation is described below.

To a stirred slurry of 37.2 g. (0.20 mole) of disodium 1,1-dimercapto-2,2-dicyanoethylene in 400 ml. of carbon tetrachloride was added dropwise at room temperature 64 g. (0.4 mole) of bromine. The temperature of the reaction mixture rose to 30° C. during the addition (30 minutes). After being stirred another 75 minutes while being heated to 40–55° C., the reaction mixture was filtered and the filtrate was concentrated by rapid distillation under a Vigreux column. Bromine, carbon tetrachloride and probably sulfur bromide were distilled. The liquid residue (2.3 g.) was subjected to distillation at reduced pressure through a small head. This removed a small quantity of a red liquid, B.P. 40–45° C. at 1 mm., which was presumably sulfur monobromide. White crystals sublimed into the still head. This solid was collected and resublimed twice at 70° C. and 1 mm. pressure to give crystals melting at 98.3–98.6° C. This was 3,5-dibromo-4-isothiazolecarbonitrile,

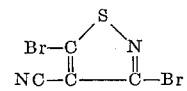

The original filter cake was extracted with ether, then with hot benzene. Evaporation of the benzene extract yielded yellow crystals of 3,5-bis-dicyanomethylene-1,2,4-trithiolane. After treatment with decolorizing charcoal and two recrystallizations from benzene, the product, which decomposes on heating, had an instantaneous melting point of 154–155° C.

*Analysis.*—Calc'd for $C_8N_4S_3$: C, 38.74; N, 22.59; S, 38.79. Found: C, 39.11; N, 20.76; S, 39.03.

The product gave the following absorption bands:
Infrared: 4.50μ, shoulder at 4.55μ, 6.8μ.
Ultraviolet (λ max. in $CH_2Cl_2$): 242 mμ (ε=3500), 323 mμ (ε=25,800), shoulder at 338 mμ (ε=23,400), 415 mμ (ε=1570).

The reactant used to convert the cyclic cyanosulfide to the alkali metal salt of the corresponding mercaptodicyanovinyl sulfide is one of the following:

A. An alkali metal alkyl xanthate

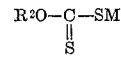

where $R^2$ is an alkyl radical and M is an alkali metal cation. Any alkali metal alkyl xanthate can be used. Thus, M can be lithium, sodium, potassium, rubidium, or cesium, and is preferably an alkali metal of atomic number 11 to 19 (sodium or potassium); $R^2$ can be any alkyl group, preferably of 1 to 6 carbon atoms. Since the radical —$OR^2$ is eliminated in the form of a by-product and is not present in the desired reaction product, it is desirable to choose as the reactant the most readily available alkyl xanthate. For this reason, the alkali metal methyl and ethyl xanthates ($R^2=CH_3$ or $C_2H_5$) are preferred.

B. An alkali metal dithiocarbamate

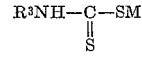

where M is an alkali metal cation as above and $R^3$ is hydrogen or an alkyl group. Preferably, $R^3$, when not hydrogen, is an alkyl group of 1 to 6 carbon atoms and still more preferably, for the already mentioned reasons, $R^3$ is methyl or ethyl.

The relative proportions of the two reactants (cyclic cyanosulfide and alkali metal alkyl xanthate or dithiocarbamate) are not critical. They are important only to the extent that it is desired to utilize the cyanosulfide as completely as possible and to avoid complications in the recovery of the reaction product. For these reasons, it is generally preferable, but by no means essential, to use at least two moles of the alkali metal alkyl xanthate or dithiocarbamate per mole of cyclic cyanosulfide. Most conveniently, the reactants are used in approximately stoichiometric amount, i.e., in 2:1 molar ratio.

The reaction is exothermic, and it can therefore take place at a very low external temperature, e.g., of the order of —50° C. The reaction temperature is not critical, but it is preferred to adjust the operating conditions, using external cooling if necessary, so that the temperature of the reaction mixture does not exceed about 100° C. In general, it is most convenient to operate at an internal temperature in the neighborhood of room temperature, e.g., in the range between about 10 and 50° C.

Since the reactants are solids, the reaction is normally conducted in an organic liquid medium which dissolves at least one of them to at least some extent, e.g., 5% by weight. Any non-acidic solvent which is substantially inert towards the reactants and reaction product is suitable for this purpose. Examples of such reaction media include acyclic or cyclic ketones such as acetone, methyl ethyl ketone or cyclohexanone; acrylic or cyclic ethers such as di-n-butyl ether, 1,2-dimethoxyethane, tetrahydrofuran or dioxane; alcohols such as methanol, butanol and cyclohexanol; nitriles such as acetonitrile, propionitrile or benzonitrile; alkanoic acid esters such as ethyl acetate or methyl propionate; and aromatic hydrocarbons such as benzene or toluene (water can be used but it is not preferred because of its low solvent action). The amounts of liquid diluent is immaterial provided it is sufficient to maintain the reactants in at least partial solution.

The two reactants can be mixed all at once with suitable provisions for dissipating the heat of reaction, but it is more convenient to add one to the other gradually in order to avoid excessive local heating. The order of addition is not critical, though better results are generally obtained when the cyclic cyanosulfide, in solution or as such, is added to the alkali metal xanthate or dithiocarbamate at least partly dissolved in the reaction medium.

The reaction product can be isolated in any suitable manner. A convenient procedure consists in adding to the reaction mixture an organic liquid which is a non-solvent for the alkali metal dimercaptide but dissolves the unchanged reactants, if any, and by-products. Suitable non-solvents are the halogenated aliphatic hydrocarbons such as chloroform, carbon tetrachloride or tetrachloroethylene, or the aliphatic hydrocarbons such as n-hexane or petroleum ether. If desired, the original solvent can first be removed by evaporation, after which the by-products can be extracted with a solvent which does not dissolve the alkali metal dimercaptide. When the latter is to be converted to another derivative, isolation is not necessary, as the second step can be carried out on the crude product after removal of the solvent.

When an ammonium or alkylammonium or a metal mercaptide is to be prepared, this second step is normally conducted in aqueous solution and at or near room temperature. If the desired derivative is one having hydrocarbon groups attached to the mercapto sulfur atoms, the alkali metal mercaptide and the hydrocarbon halide are usually brought in conact in one of the organic solvents mentioned above, or an excess of the hydrocarbon halide can be used as the reaction medium if it is a liquid. The reaction temperature is normally in the range of 10–150° C.

As can be seen from their structure, the products of this invention present possibilities of cis-trans isomerism. In some cases, chemical evidence suggests which of the possible geometric isomers is the primary product. For example, the product obtained from tetracyano-1,4-dithiin and potassium ethyl xanthate is thought to be preponderantly the cis-trans isomer,

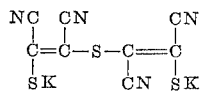

However, no assumption regarding geometrical configuration will be made since the products are probably isomeric mixtures in many cases. Furthermore, they can be partly or wholly converted to other geometric isomers by methods known to effect such conversions.

The products of this invention are colored. They have good thermal stability and can generally be heated to their melting points with little decomposition. The products are not reduced by sodium borohydride, and in this respect they differ from disulfides.

The following examples illustrate the invention:

EXAMPLE I

A solution 10.8 g. (0.05 mole) of tetracyano-1,4-dithiin in 200 ml. of acetone was added over a 30 minute period to a stirred solution of 16.0 g. (0.1 mole) of potassium ethyl xanthate in 500 ml. of acetone. The reaction temperature was about 20° C. After 0.5 hour of additional stirring, the solvent was removed under reduced pressure and the residue was extracted several times with 50 ml. portions of low boiling petroleum ether at reflux. The petroleum ether extracts gave, on evaporation to dryness, 6.1 g. of a solid product which was identified by its melting point (55° C., which is the melting point reported in the literature) and by elemental analysis as the anhydrosulfide of ethyl xanthic acid, also called ethyl xanthic thioanhydride,

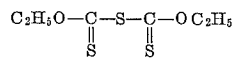

*Analysis.*—Calc'd for $C_6H_{10}O_2S_3$: C, 34.76; H, 4.76. Found: C, 34.11; H, 4.74.

The petroleum ether-insoluble residue (19 g.) was dissolved in 300 ml. of acetone and the solution was filtered, removing 2.21 g. of insoluble material. The acetone filtrate was treated with 1 liter of chloroform. The resulting yellow precipitate (11 g., 65% yield) melted with decomposition at 280–285° C. This was the dipotassium salt of bis(2-mercaptodicyanovinyl) sulfide,

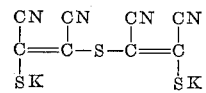

*Analysis.*—Calc'd for $C_8N_4S_3K_2$: C, 29.42; N, 17.16; S, 29.46. Found: C, 28.70; N, 17.31; S, 29.51.

The infrared spectrum showed characteristic absorption bands at $4.53\mu$ ($C{\equiv}N$) and $6.76\mu$ ($C{=}C$), and the ultraviolet spectrum showed λ max. ($C_2H_5OH$) at 380 m$\mu$ ($k{=}57.5$) and 218 m$\mu$ ($k{=}53.0$).

EXAMPLE II

A solution of 6.26 g. (0.02 mole) of tetra-n-proylammonium iodide in 100 ml. of water was added slowly at room temperature to a stirred solution of 3.26 g. (0.1 mole) of the dipotassium salt of bis(2-mercaptodicyanovinyl) sulfide in 100 ml. of water. A bright orange precipitate of the di(tetra-n-propylammonium) salt

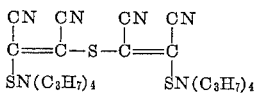

formed and was removed by filtration and dried (5.90 g., 95% yield). After recrystallization from ethanol, it melted at 207–212° C.

*Analysis.*—Calc'd for $C_{32}H_{56}N_6S_3$: C, 61.89; H, 9.09. Found: C, 61.55; H, 8.92.

The infrared spectrum was consistent with the assigned structure. The ultraviolet spectrum showed λ max. ($C_2H_5OH$) at 378 m$\mu$ ($k{=}30.5$) and a shoulder at 220 m$\mu$ ($k{=}26.4$).

EXAMPLE III

The di(tetramethylammonium) salt of bis(2-mercaptodicyanovinyl) sulfide was prepared, using the procedure of Example II, from 10.62 g. (0.325 mole) of the dipotassium salt and 10.8 g. (0.1 mole) of tetramethylammonium chloride. On recrystallization from methanol, it was obtained as bright orange-yellow crystals, M.P. 215–217° C. (dec.).

*Analysis.*—Calc'd for $C_{16}H_{24}N_6S_3$: C, 48.47; H, 6.11; N, 21.19; S, 24.26. Found: C, 48.04; H, 5.95; N, 20.48; S, 24.61.

EXAMPLE IV

A solution of 17 g. (0.1 mole) of silver nitrate in 100 ml. of water was added slowly at room temperature with vigorous stirring to a solution of 16.6 g. (0.05 mole) of the dipotassium salt of bis(2-mercaptodicyanovinyl)sulfide in 500 ml. of water containing 100 ml. of ethanol. The solid which formed was collected by filtration, washed well with ethanol and dried. There was obtained 21.8 g. (94% yield) of the disilver salt of bis(2-mercaptodicyanovinyl) sulfide.

*Analysis.*—Calc'd for $C_8N_4S_3Ag_2$: Ag, 46.6. Found: Ag, 44.56.

The infrared spectrum of the disilver salt closely resembled that of the dipotassium salt.

EXAMPLE V

To a suspension of 9.3 (0.02 mole) of the silver salt of Example IV, finely ground, in 200 ml. of acetonitrile was added at room temperature over a one-hour period 30 ml. (an excess) of methyl iodide. The reaction mixture was then heated to reflux for 2.5 hours, during which its color gradually became yellow. The insoluble material was removed by filtration and the filtrate was evaporated to dryness under reduced pressure. Recrystallization of the residue from a methylene chloride-methylcyclohexane mixture, then from an ethanol/methylcyclohexane mixture gave 3.72 g. (67% yield) of bis(2-methylmercaptodicyanovinyl) sulfide,

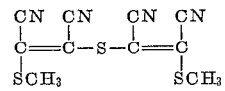

An analytical sample further recrystallized from a diethyl ether/methylcyclohexane mixture melted at 123.0–123.5° C.

*Analysis.*—Calc'd for $C_{10}H_6N_4S_3$: C, 43.14; H, 2.16; S, 34.55. Found: C, 42.87; H, 2.25; S, 34.43.

The infrared spectrum showed bands at 4.45μ, 4.50μ (C≡N), 6.56μ, 6.64μ (C=C) and 7.01μ, 7.54μ (SCH₃). The ultraviolet spectrum showed λ max. ($C_2H_5OH$) at 339 mμ ($k$=56.9), 375 mμ (shoulder; $k$=42.5), 265 mμ ($k$=19.1) and 220 mμ ($k$=34.6).

EXAMPLE VI

This example illustrates the already mentioned conversion to other geometric isomers of the compounds of this invention.

A solution of the dipotassium salt of bis(2-mercaptodicyanovinyl) sulfide in ethanol was heated to reflux for four days. Isomerization took place during this treatment, as shown by conversion of the potassium salt to the silver salt, then to bis(2-methylmercaptodicyanovinyl) sulfide by the procedure described in Examples IV and V. This last compound, which analyzed correctly for $C_{10}H_6N_4S_3$, was an isomeric mixture, as shown by the fact that, even after repeated recrystallization from a diethyl ether/methylcyclohexane mixture, it melted over a wide range (74–90° C.). Its infrared spectrum was very similar to that of the product of Example V.

EXAMPLE VII

This example illustrates the conversion of 3,5-bis-dicyanomethylene-1,2,4-trithiolane to a salt of bis(1-mercaptodicyanovinyl) sulfide in accordance with the following equation:

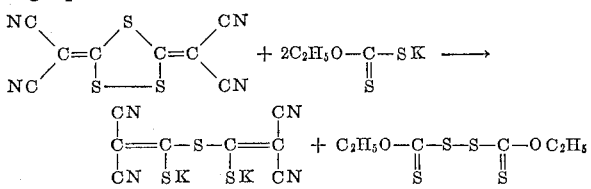

An acetone solution of 2.48 g. (0.01 mole) of 3,5-bis-dicyanomethylene-1,2,4-trithiolane was added to an acetone solution of 3.2 g. (0.02 mole) of potassium ethyl xanthate by the procedure of Example I. The reaction mixture was a deep red locally at the point of addition but faded rapidly to yellow. Dilution of the reaction mixture with chloroform gave two fractions, the first of which was characterized by its ultraviolet spectrum as the dipotassium salt of bis(1-mercaptodicyanovinyl) sulfide. The second fraction appeared to be an isothiazole derivative resulting from impurities in the starting material.

The dipotassium salt was reacted without purification with tetra-n-propylammonium iodide by the procedure described in Example II. There was thus formed the di(tetra-n-propylammonium) salt of bis(1-mercaptodicyanovinyl) sulfide,

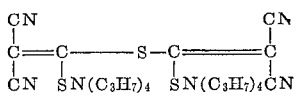

which, after three recrystallizations from ethanol, was obtained as yellow plates, M.P. 209–212° C.

*Analysis.*—Calc'd for $C_{32}H_{56}N_6S_3$: C, 61.89; H, 9.09; N, 13.55; S, 15.50. Found: C, 61.58; H, 9.14; N, 13.54; S, 15.81.

The ultraviolet spectrum showed λ max. ($C_2H_5OH$) at 351 mμ ($k$=38.5) with a shoulder at 310–330 mμ.

EXAMPLE VIII

The reaction described in this example is represented by the equation:

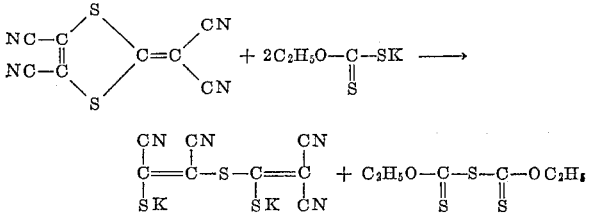

A solution of 10.8 g. (0.05 mole) of 2-dicyanomethylene-4,5-dicyano-1,3-dithiolene in 100 ml. of acetone was added at room temperature to a stirred solution of 16 g. (0.1 mole) of potassium ethyl xanthate in 275 ml. of acetone over a 45-minute period. After stirring for an additional 15 minutes and concentrating to one-half volume, the solution was slowly diluted with chloroform. The resulting yellow precipitate was collected by filtration, washed with chloroform and dried. This was the dipotassium salt of (2-mercaptodicyanovinyl)(1-mercaptodicyanovinyl) sulfide, which was characterized by its ultraviolet spectrum showing λ max. ($C_2H_5OH$) at 343 mμ ($k$=62.1), 380 mμ ($k$=40.4) and 270 mμ ($k$=18.1).

EXAMPLE IX

The reaction of Example VIII was repeated, using 0.01 mole of the cyanosulfide. At the end of the reaction, the solvent was removed under reduced pressure and the red solid residue was extracted with pentane to remove the anhydrosulfide of ethyl xanthic acid. The residue from this extraction was dissolved in water, the aqueous solution was decolorized by contact with absorbent carbon and then treated with 0.02 mole of tetra-n-propylammonium bromide, added as a concentrated aqueous solution. There was obtained 5.47 g. (89.5% yield) of a yellow precipitate of the di-(tetra-n-propylammonium) salt of (2-mercaptodicyanovinyl)(1-mercaptodicyanovinyl) sulfide which, after recrystallization from ethanol, formed orange plates, M.P. 173–175° C. whose infrared spectrum was consistent with the assigned structure. An analytical sample further recrystallized from ethanol melted at 179–181° C.

*Analysis.*—Calc'd for $C_{32}H_{56}N_6S_3$: C, 61.89; H, 9.09. Found: C, 61.96; H, 9.03.

The ultraviolet spectrum showed λ max. (C₂H₅OH) at 343 mμ ($k$=36.8), 380 mμ (shoulder; $k$=26.1) and 270 mμ ($k$=10.4).

EXAMPLE X

This and the following example illustrate the preparation of compounds of this invention using salts of dithiocarbamic acid and N-monoalkyldithiocarbamic acids instead of salts of alkylxanthic acids.

A solution of 21.6 g. (0.1 mole) of tetracyano-1,4-dithiin in 200 ml. of acetone was added to a suspension of 31.8 g. (0.2 mole) of potassium ethyldithiocarbamate in 500 ml. of acetone with vigorous stirring and cooling to ice bath temperature. The addition took approximately one hour. The solvent was then removed under reduced pressure and 500 ml. of water was added to the residue. Filtration removed 7.7 g. of a red-brown solid decomposing around 200° C. which was not examined further. To the filtrate was added 0.2 mole of tetra-n-propylammonium bromide as a saturated aqueous solution, and the yellow precipitate which formed was collected and air-dried. There was thus obtained 54 g. (88.5% yield) of the di(tetra-n-propylammonium)salt of bis(2-mercaptodicyanovinyl)sulfide, M.P. 210–220° C. Recrystallization from absolute ethanol afforded a purified product melting at 211–213° C. This product was identical wtih that of Example II, as shown by a mixed melting point (211–214° C.) and by comparison of the infrared spectra.

In a second preparation, the dipotassium salt of bis-(2-mercaptodicyanovinyl)sulfide was isolated as described earlier and shown to be identical with the product of Example I.

EXAMPLE XI

This product was identical to that of Examples II and X. that the potassium ethyldithiocarbamate was replaced by 26.2 g. (0.2 mole) of potassium dithiocarbamate. The di(tetra-n-propylamonium)salt (57.5 g) was isolated in the same manner. After recrystallization from absolute ethanol it formed orange crystals, M.P. 211–214° C. This product was identical to that of Examples II and X.

A number of representative compounds of this invention have been described in the foregoing examples. These examples are, however, merely illustrative. As already stated, the compounds of this invention are mercaptodicyanovinyl sulfide derivatives generically represented by the formula I. 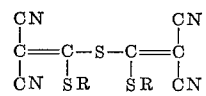

where one of X and Y and one of X¹ and Y¹ is —CN and the other is —SR, R being a metal preferably a Group I metal of atomic number 3 to 55; an ammonium cation $R^1{}_mH_{4-m}N^+$ ($m$ being an integer of 0 to 4 and R¹ an alkyl group, preferably of 1 to 6 carbon atoms); or a hydrocarbon group, preferably of 1 to 12 carbon atoms. When R is hydrocarbon, it can be alkyl of 1 to 12 carbons (such compounds being the most readily and economically available, therefore preferred); alkenyl of 3 to 12 carbons, cycloalkyl of 5 to 12 carbons, or aryl, aralkyl or alkaryl of 6 to 12 carbons.

Other examples of compounds of this invention that can be prepared by the methods described in the above detailed examples are:

(a) The bis(2-mercaptodicyanovinyl)sulfide derivatives

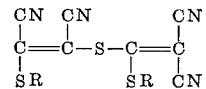

where R is lithium, sodium, copper, ammonium, ethylammonium, (tetra-n-hexyl)ammonium, ethyl, sec.-butyl, n-dodecyl, allyl, 7-octenyl, phenyl, p-diphenyl, benzyl;

(b) The bis(1-mercaptodicyanovinyl)sulfide derivatives

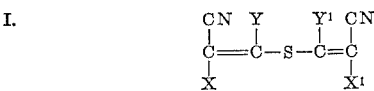

where R is cesium, barium, zinc, dibutylammonium, trimethylammonium, isopropyl, n-amyl, p-tolyl, p-dicyclohexyl;

(c) The (2-mercaptodicyanovinyl)(1 - mercaptodicyanovinyl)sulfide derivatives

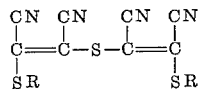

where R is sodium, mercury, iron, methylammonium, (tetra-n-amyl)ammonium, methyl, n-hexyl, cyclopentyl, phenylethyl, β-naphthyl.

The preferred products, because they are derived from the readily available tetracyano-1,4-dithiin, are the bis(2-mercaptodicyanovinyl)sulfide derivatives of group (a) above.

The products of this invention are generically useful as dyes for a variety of natural and synthetic fibers. Dyeing tests with four representative compounds are described below. These compounds are:

A. The dipotassium salt of bis(2-mercaptodicyanovinyl)sulfide.
B. Bis(2-methylmercaptodicyanovinyl)-sulfide.
C. The di(tetra-n-propylammonium) salt of (2-mercaptodicyanovinyl)(1-mercaptodicyanovinyl)-sulfide.
D. The di(tetra-n-propylammonium) salt of bis(1-mercaptodicyanovinyl)sulfide.

These products were tested on fabrics of the following materials: (1), silk; (2), wool; (3), cellulose acetate; (4), polyhexamethyleneadipamide; (5), a commercial acrylonitrile polymer.

The dyeing tests were conducted in all cases by adding 20 mg. of the product (first dissolved in a small amount of acetone for products B–D) with stirring to 100 ml. of water containing 20 mg. of a commercial sulfonated lignin-dispersing agent. The test cloth was immersed in this bath, which was then heated at 95–100° C. for one hour. The cloth was removed, washed well with soap and water and dried. The table below shows the results of these tests.

TABLE

| Fabric | Product | | | |
|---|---|---|---|---|
| | A | B | C | D |
| 1 | Yellow | Tan | Tan | Tan. |
| 2 | Yellow | Brown | Tan | Tan. |
| 3 | | Yellow | | |
| 4 | Yellow | Brown | Yellow | Yellow. |
| 5 | | Brown | Brown | Brown. |

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A mercaptodicyanovinyl sulfide having the formula:

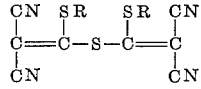

wherein R is selected from the group consisting of a metal ion, hydrocabon of 1 to 12 carbon atoms, and $R^1{}_mH_{4-m}N^+$, wherein R1 is alkyl of 1 to 6 carbon atoms, and $m$ is an integer from 0 to 4.

2. A mercaptodicyanovinyl sulfide having the formula:

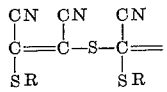

wherein R is selected from the group consisting of a metal ion, hydrocarbon of 1 to 12 carbon atoms, and $R^1_m H_{4-m} N^+$, wherein $R^1$ is alkyl of 1 to 6 carbon atoms, and $m$ is an integer from 0 to 4.

3. A mercaptodicyanovinyl sulfide having the formula

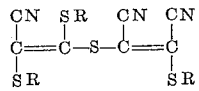

wherein R is a metal ion.

4. A mercaptodicyanovinyl sulfide having the formula

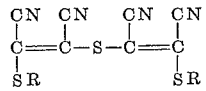

wherein R is hydrocarbon of 1 to 12 carbon atoms.

5. A mercaptodicyanovinyl sulfide having the formula

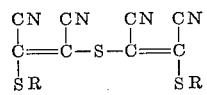

wherein R is $R^1_m H_{4-m} N^+$, wherein $R^1$ is alkyl of 1 to 6 carbon atoms and $m$ is an integer from 0 to 4.

6. The compound of the formula

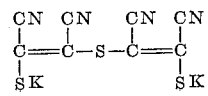

7. The compound of the formula

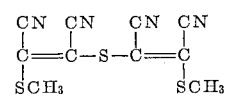

8. The compound of the formula

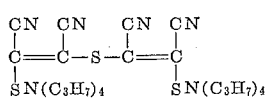

9. The compound of the formula

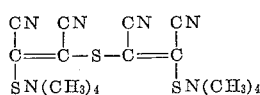

10. A mercaptodicyanovinyl sulfide having the formula:

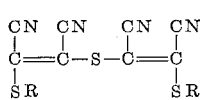

wherein R is selected from the group consisting of a metal ion, hydrocarbon of 1 to 12 carbon atoms, and $R^1_m H_{4-m} N^+$, wherein $R^1$ is alkyl of 1 to 6 carbon atoms, and $m$ is an integer from 0 to 4.

No references cited.

CHARLES B. PARKER, *Primary Examiner.*

NICHOLAS S. RIZZO, *Examiner.*